2 Sheets—Sheet 1.

T. C. HISTED.
Grain-Separator.

No. 199,204. Patented Jan. 15, 1878.

WITNESSES:
C. Neveux
Edgar Tate

INVENTOR:
T. C. Histed.
BY
ATTORNEYS.

2 Sheets—Sheet 2.

T. C. HISTED.
Grain-Separator.

No. 199,204. Patented Jan. 15, 1878.

WITNESSES:
C. Neveux
J. H. Scarborough

INVENTOR:
T. C. Histed.
BY Munn & Co.
ATTORNEYS.

UNITED STATES PATENT OFFICE.

THADDEUS C. HISTED, OF SALINA, KANSAS.

IMPROVEMENT IN GRAIN-SEPARATORS.

Specification forming part of Letters Patent No. 199,204, dated January 15, 1878; application filed October 17, 1877.

*To all whom it may concern:*

Figure 1:
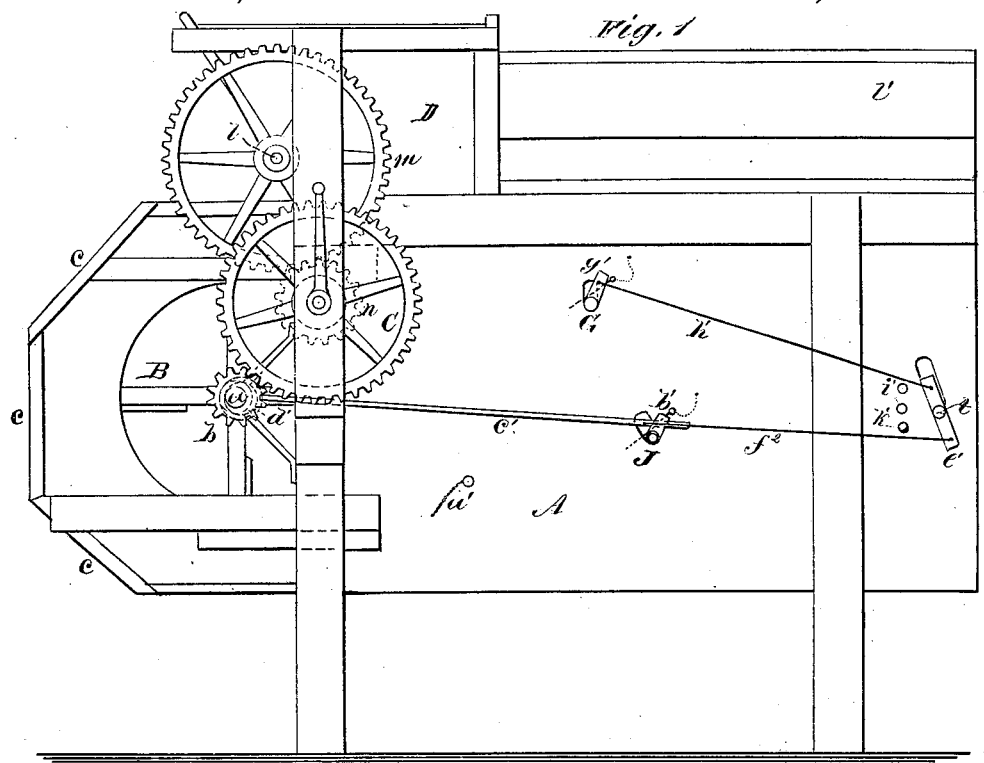
Figure 2:
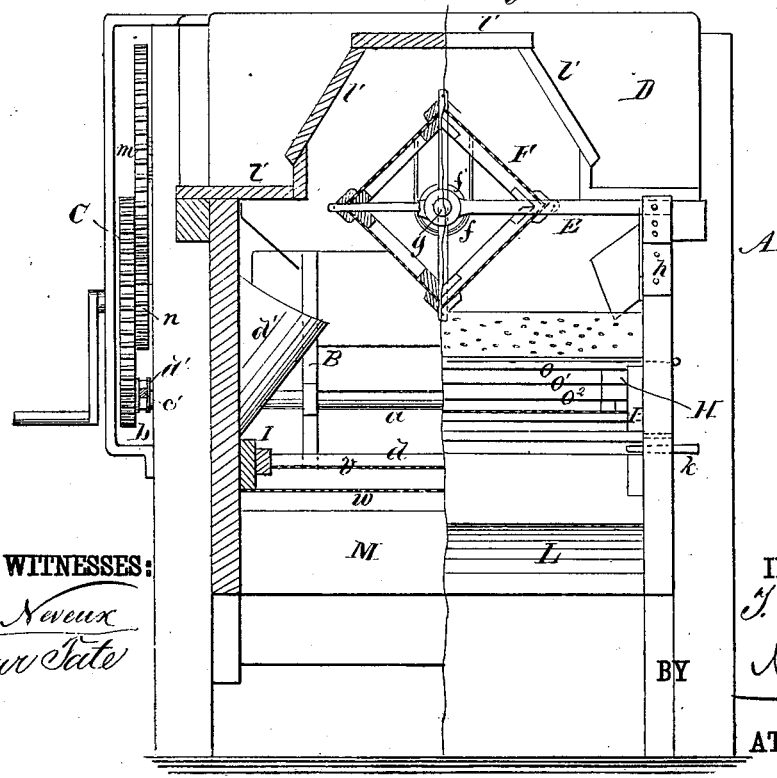
Figure 3:
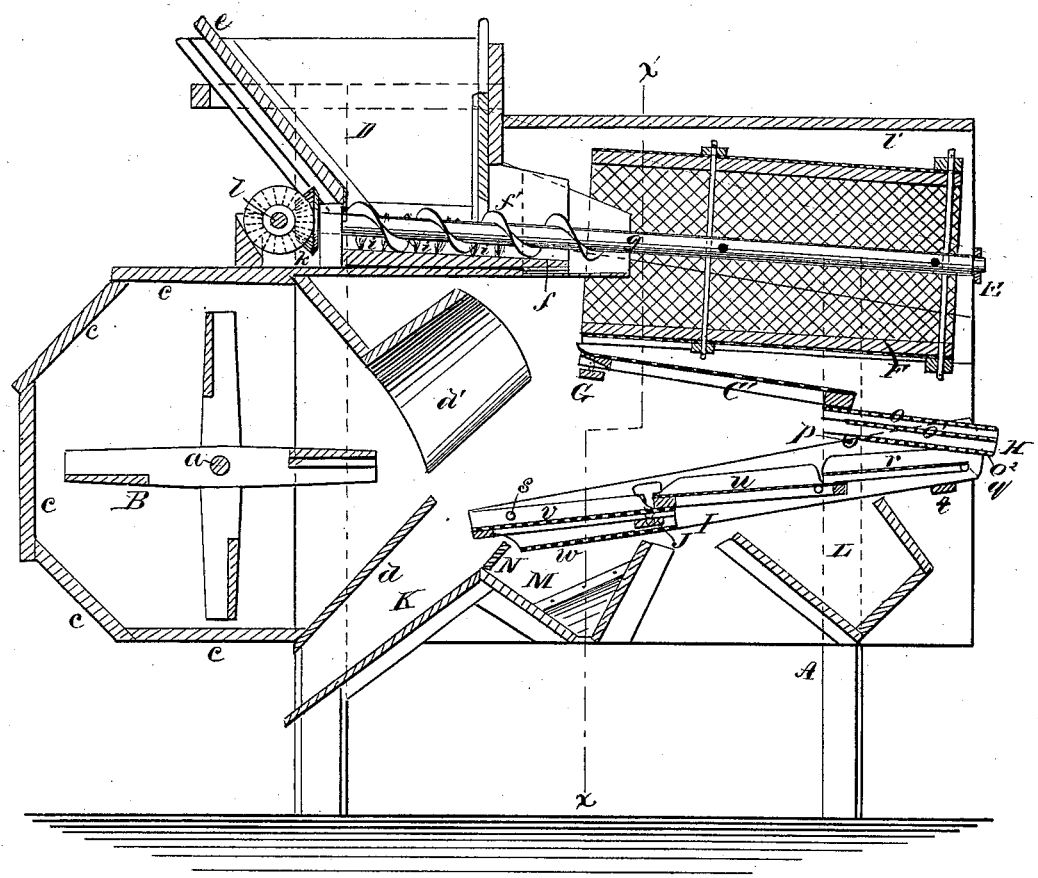

Be it known that I, THADDEUS CONSTANTINE HISTED, of Salina, in the county of Salina and State of Kansas, have invented a new and Improved Fanning-Mill, of which the following is a specification:

Figure 1 is a side elevation of my improved fanning-mill. Fig. 2 is an end elevation, partly in section, on line $x\,x$. Fig. 3 is a vertical longitudinal section through the center of the machine.

Similar letters of reference indicate corresponding parts.

The object of my invention is to provide a fanning-mill which will separate the grain from other seeds and foreign substances and assort it into several grades.

The invention will first be described in connection with the drawings, and then pointed out in claims.

In the drawing, A is the frame which supports the several parts of the mill, and in which the shaft $a$ of the fan B is journaled. This shaft is provided with a pinion, $b$, which is driven by a spur-wheel, C, in the usual way. The fan is inclosed by a drum formed of boards $c$, which overlap each other, and form a semi-octagonal drum or case. At the rear of the fan there is a wind-board, $d$, and above the wind-board there are curved deflectors $d'$, designed for directing the wind against a revolving riddle, which will be presently described. At the top of the frame there is a hopper, D, having a removable side, $e$. In the bottom of the hopper a trough, $f$, is formed, in which a shaft, $g$, is journaled, which extends toward the rear of the machine at right angles to the fan-shaft $a$, and is inclined downward toward the rear end of the machine, where it is journaled in a bar, E, which is supported in irons $h$, in which there are several holes for receiving a pin, by means of which the bar may be supported at the required height. Upon the shaft $g$ in the trough $f$ a screw or spiral rib, $f'$, is formed, which, as the shaft revolves, carries the grain from the hopper D forward to the rotating riddle F, which is carried by the shaft $g$. The riddle consists of four rectangular frames, covered with wire-cloth of a suitable mesh to permit wheat to readily pass through it, and joined together to form a rectangular wire-cloth tube of sufficient length to reach to the rear end of the machine. Several brushes, $i$, are placed in the trough $f$, and act in conjunction with the spiral rib $f'$ in removing smut from the grain. Upon the forward end of the shaft $g$ there is a miter-wheel, $k$, which is driven by a similar wheel on a shaft, $l$, journaled in the top of the frame A, and having on its outer end a spur-wheel, $m$, which takes motion from a pinion, $n$, on the shaft of the wheel C. A perforated grain-chute, C', is supported at one end by a shaft, G, and at the other by a rod that runs across the frame A. This chute is inclined downward toward the rear of the machine, and extends over the upper edge of a screen, H, consisting of three sieves, $o\ o^1\ o^2$, placed one above the other, a small distance apart and parallel to each other, and secured to end pieces, which are supported in the shoe I by the rod $p$, which runs through staples in the end pieces and through the sides of the shoe, and by the bar $q$, which projects into the side pieces, and to which is attached the screen $r$. The shoe I inclines downward toward the front of the mill, and is supported at its forward end by a rod, $s$, and at its upper rear end by the flat rocking shaft $t$.

The shoe I contains four screens, the upper one, $r$, being placed under the screen H with its lower edge overlapping the screen $u$. The screen $u$ overlaps the screen $v$, and the screen $w$, which is narrower than the screen $v$, is placed under and a short distance from the screen $v$. The upper edge of the screen $v$ is supported by a flat rocking shaft, J, and its lower edge projects over the grain-chute K.

The screen $r$ is of fine mesh, and is designed to separate wheat from chess and small seeds. The screen $u$ is of coarser mesh than the screen $r$, and is designed to separate the first and second grades of grain from the third. The third grade drops through the screen $u$ into the box L, while the first and second pass to the screen $v$. The second grade drops through the screen $v$ to the screen $w$, which carries it forward and delivers it to the box or hopper M. The first grade of grain falls from the edge of the screen $v$ to the chute K.

A valve, N, is hinged to the upper edge of the forward side of the hopper, and is capable of being lowered, so that the grain that falls upon the screen $w$ will be delivered to the chute K, instead of the box M. This valve is operated by a cord, $a'$, which passes through a hole in the side of the mill.

The rock-shaft J is provided with an arm, $b'$, which is connected by a rod, $c'$, with an eccentric, $d'$, on the shaft $a$. The rocker-shaft $t$ is provided with the lever $e'$, having equal arms, the lower one of which is connected with the arm $b'$ by a rod, $f^2$. The upper arm is connected by a rod, $h'$, with an arm, $g'$, secured to the end of the shaft G.

One end of the shaft $t$ may be placed in either of a series of holes formed in the side of the mill. The other end is placed in a slot, in which it may be supported at different heights by pins running across the slot.

The object of this arrangement is to vary the inclination of the shoe I. Several holes, $i'$, are formed in the sides of the mill, in any one of which a pin, $k'$, may be placed. The shoe I is raised by the shaft $t$ at each oscillation, and when it drops it strikes the pins $k'$.

The rotating riddle F is covered with a housing composed of the boards $l'$, arranged to overlap each other, so as to resist the elements.

Grain is placed in the hopper D, and the machine is rotated by hand or power. The screw-thread $f^1$ carries the grain forward through the trough $f$ to the rotating riddle, where, by the combined action of the blast from the fan on the shaft $a$ and the rotation of the riddle, the straw and chaff are separated from the grain, which falls through the meshes of the riddle to the perforated grain-chute $C'$, which conveys it to the screen H, through which it drops to the screen $v$, and in falling from one to the other of the sieves $o\ o^1\ o^2$ the light particles are blown out at the rear of the machine. The grain passes from the screen $r$ to the screens $u$ and $v$, as before described.

The chute $C'$ is rapidly vibrated and given a slight end movement by the shaft G, and the shoe I is moved by the shaft $t$, as before described, and the screens $u\ v$ are rapidly vibrated by the shaft J.

The grain in passing through the machine is thoroughly acted on, and the machine requires but little power to drive it.

The casing of the mill is so constructed that when the removable side $e$ of the hopper is taken out and laid over the hopper, so as to cover the trough $f$, all of the working parts of the mill are completely housed, and protected from the action of the elements.

Having thus described my invention, I claim as new and desire to secure by Letters Patent—

1. The combination, with a fan and rotary riddle, of curved deflectors $d'$, arranged to direct the blast into the open end of the rotary riddle, as shown and described.

2. The combination, with shoe I, of the vibratory shaft $t$ and pins $k'$, arranged substantially as and for the purpose specified.

THADDEUS CONSTANTINE HISTED.

Witnesses:
G. B. ROUSE,
F. A. WILLIAMS.